US011919360B2

(12) United States Patent
Takagi et al.

(10) Patent No.: US 11,919,360 B2
(45) Date of Patent: Mar. 5, 2024

(54) VEHICLE HEAT MANAGEMENT SYSTEM

(71) Applicant: SUBARU CORPORATION, Tokyo (JP)

(72) Inventors: Yasushi Takagi, Tokyo (JP); Shinya Kurasawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 42 days.

(21) Appl. No.: 16/528,779

(22) Filed: Aug. 1, 2019

(65) Prior Publication Data

US 2020/0101810 A1 Apr. 2, 2020

(30) Foreign Application Priority Data

Sep. 28, 2018 (JP) ................................ 2018-185262

(51) Int. Cl.
*B60H 1/00* (2006.01)
*B60L 58/26* (2019.01)
(Continued)

(52) U.S. Cl.
CPC ..... *B60H 1/00028* (2013.01); *B60H 1/00278* (2013.01); *B60L 58/26* (2019.02); *B60R 16/04* (2013.01); *B60H 1/3228* (2019.05)

(58) Field of Classification Search
CPC .............. B60H 1/32284; B60H 1/3204; B60H 1/3205; B60H 1/3222; B60H 1/3223;
(Continued)

(56) References Cited

U.S. PATENT DOCUMENTS 7,789,176 B2 * 9/2010 Zhou .................. B60H 1/32281 180/65.1
9,511,645 B2 * 12/2016 Johnston ............ B60H 1/00921
(Continued)

FOREIGN PATENT DOCUMENTS

JP 2015-012793 A1 1/2015
JP 2016137773 A 8/2016

OTHER PUBLICATIONS

Japanese Office Action issued in Application No. JP 2018-285262; dated May 24, 2022; with Machine Translation.

*Primary Examiner* — Paul Alvare
(74) *Attorney, Agent, or Firm* — TROUTMAN PEPPER HAMILTON SANDERS LLP

(57) ABSTRACT

A vehicle heat management system includes a refrigerant circuit, a heating circuit, a battery temperature regulation circuit, and an electric part cooling circuit. The refrigerant circuit is configured to circulate a refrigerant to regulate a temperature inside a passenger compartment therethrough. The heating circuit is configured to circulate a liquid that exchanges heat with the refrigerant therethrough. The heating circuit is capable of regulating the temperature inside the passenger compartment. The battery temperature regulation circuit is configured to regulate a temperature of a battery by introducing a liquid that exchanges heat with the refrigerant to the battery. The electric part cooling circuit is couplable to the battery temperature regulation circuit and configured to circulate a liquid able to cool an electric part for driving a vehicle therethrough.

10 Claims, 16 Drawing Sheets

(51) Int. Cl.
*B60R 16/04* (2006.01)
*B60H 1/32* (2006.01)

(58) Field of Classification Search
CPC .. B60H 1/3225; B60H 1/3227; B60H 1/3229; B60H 1/323; B60H 1/3232; B60H 1/00278; B60H 1/00328; B60H 1/00342; B60H 1/00385; B60H 1/00392; B60H 2001/003; B60H 2001/00307; B60H 1/143
See application file for complete search history.

(56) References Cited

U.S. PATENT DOCUMENTS

| | | | | |
|---|---|---|---|---|
| 9,533,544 | B2 * | 1/2017 | Johnston | B60H 1/00278 |
| 9,533,546 | B2 * | 1/2017 | Cheng | B60K 1/04 |
| 9,731,576 | B2 * | 8/2017 | Johnston | B60H 1/00278 |
| 9,731,577 | B2 * | 8/2017 | Johnston | B60H 1/00278 |
| 9,731,578 | B2 * | 8/2017 | Johnston | B60H 1/00278 |
| 9,758,010 | B2 * | 9/2017 | Johnston | B60H 1/3213 |
| 9,758,011 | B2 * | 9/2017 | Johnston | B60H 1/00278 |
| 9,758,012 | B2 * | 9/2017 | Johnston | B60H 1/00921 |
| 9,844,995 | B2 * | 12/2017 | Rawlinson | B60L 1/003 |
| 9,863,726 | B2 * | 1/2018 | Maeda | B60H 1/00885 |
| 10,046,617 | B2 * | 8/2018 | Smith | B60H 1/00392 |
| 10,688,847 | B2 * | 6/2020 | Kim | B60H 1/00899 |
| 10,766,338 | B2 * | 9/2020 | Oh | B60H 1/00899 |
| 11,207,946 | B2 * | 12/2021 | Lee | B60H 1/00278 |
| 2012/0225341 | A1 * | 9/2012 | Major | B60L 3/003 429/120 |
| 2016/0023532 | A1 * | 1/2016 | Gauthier | B60L 50/66 62/243 |
| 2016/0229282 | A1 * | 8/2016 | Hettrich | B60H 1/00278 |
| 2016/0318370 | A1 * | 11/2016 | Rawlinson | B60L 3/0061 |
| 2017/0021698 | A1 * | 1/2017 | Hatakeyama | B60H 1/143 |
| 2017/0267056 | A1 * | 9/2017 | Kim | B60H 1/00278 |
| 2018/0319246 | A1 * | 11/2018 | Allgaeuer | H01M 10/6568 |
| 2019/0047363 | A1 * | 2/2019 | Sonnekalb | B60H 1/00278 |
| 2019/0135075 | A1 * | 5/2019 | Hwang | B60H 1/00 |
| 2019/0176563 | A1 * | 6/2019 | Kim | B60H 1/00885 |
| 2019/0308491 | A1 * | 10/2019 | Lee | B60H 1/00278 |
| 2020/0047586 | A1 * | 2/2020 | Gonze | B60H 1/00899 |
| 2020/0079177 | A1 * | 3/2020 | Ferraris | B60L 58/27 |
| 2020/0101810 | A1 * | 4/2020 | Takagi | B60H 1/00278 |
| 2020/0101814 | A1 * | 4/2020 | Takagi | B60H 1/00007 |
| 2020/0101816 | A1 * | 4/2020 | Takagi | B60H 1/00885 |
| 2020/0189357 | A1 * | 6/2020 | Chopard | B60H 1/00921 |

* cited by examiner

VEHICLE HEAT MANAGEMENT SYSTEM

CROSS-REFERENCE TO RELATED APPLICATIONS

The present application claims priority from Japanese Patent Application No. 2018-185262 filed on Sep. 28, 2018, the entire contents of which are hereby incorporated by reference.

BACKGROUND

The disclosure relates to a vehicle heat management system.

In the related art, Japanese Unexamined Patent Application Publication No. 2016-137773 relates to a system configuration of a vehicular air conditioning device of an electric vehicle, and describes that a battery cycle and a refrigeration cycle (air conditioning) exchange heat, additionally that a three-way valve is formed between the battery cycle and a power module cycle, and that temperature regulation is performed.

SUMMARY

An aspect of the disclosure provides a vehicle heat management system including a refrigerant circuit, a heating circuit, a battery temperature regulation circuit, and an electric part cooling circuit. The refrigerant circuit is configured to circulate a refrigerant to regulate a temperature inside a passenger compartment therethrough. The heating circuit is configured to circulate a liquid that exchanges heat with the refrigerant therethrough. The heating circuit is capable of regulating the temperature inside the passenger compartment. The battery temperature regulation circuit is configured to regulate a temperature of a battery by introducing a liquid that exchanges heat with the refrigerant to the battery. The electric part cooling circuit is couplable to the battery temperature regulation circuit and configured to circulate a liquid able to cool an electric part for driving a vehicle therethrough.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
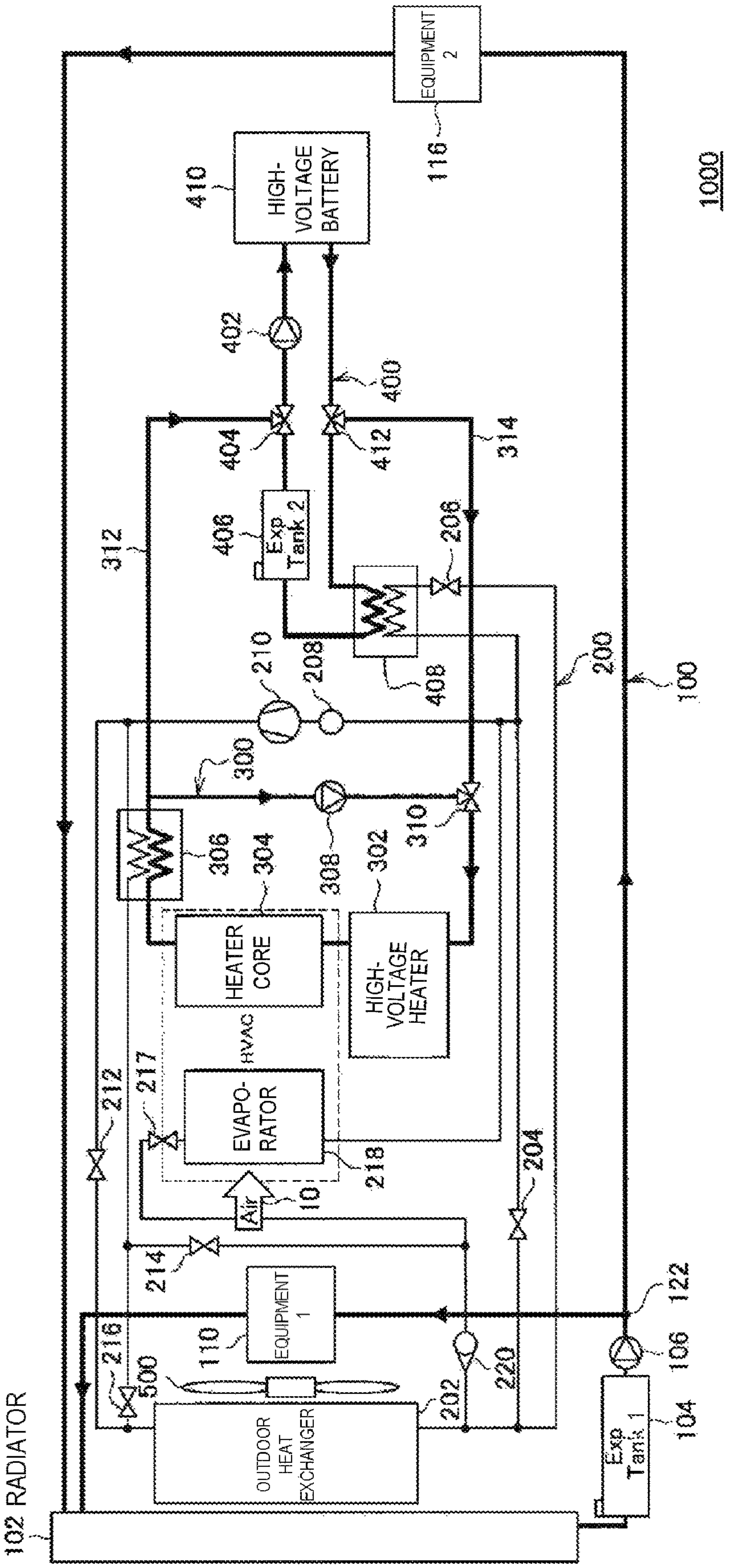
FIG. 1 is a schematic diagram illustrating a schematic configuration of a vehicle heat management system according to an embodiment of the disclosure.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

In the technology described in JP-A No. 2016-137773 above, since only the simple exchange of heat is executed between the battery cycle and the refrigeration cycle, under conditions in which the temperature of the refrigerant cannot be controlled optimally because of the outdoor air temperature or the like for example, it is difficult to bring the battery temperature to a suitable temperature.

In particular, in an electric vehicle, since the amount of generated heat and the demanded temperature of a high-voltage part to be cooled is lower than an ordinary vehicle using an internal combustion engine, it becomes more difficult to create a temperature difference in the heat exchanger. Also, for heating, since an internal combustion engine to act as a heat source does not exist in an electric vehicle, and a sufficient amount of heat is not obtained from the waste heat of the high-voltage part, it is necessary to provide separate devices for generating heat, and the efficiency of these devices greatly influences the energy efficiency. For this reason, in the case in which multiple objects of temperature adjustment exist, multiple devices needed for cooling and heating also become necessary, and control also becomes more complicated, leading to increased cost and weight of the vehicle.

It is desirable to provide a novel and improved vehicle heat management system capable of regulating the temperature of the battery with optimal energy efficiency.

1. Configuration of Heat Management System

First, FIG. 1 will be referenced to describe a schematic configuration of a vehicle heat management system 1000 according to an embodiment of the disclosure. The heat management system 1000 is installed in a vehicle such as an electric vehicle. As illustrated in FIG. 1, the heat management system 1000 includes a power electronics cooling circuit 100, a refrigerant circuit 200, a heating circuit 300, and a battery temperature regulation circuit 400. In the heat management system 1000, the regulation of the temperature inside the passenger compartment and the regulation of the temperature of the battery for driving the vehicle are realized by the combination of the power electronics cooling circuit 100, the refrigerant circuit 200, the heating circuit 300, and the battery temperature regulation circuit 400.

1.1. Configuration of Power Electronics Cooling Circuit

The power electronics cooling circuit 100 is coupled to power electronics for driving the vehicle, and cools these power electronics. Specifically, the power electronics cooling circuit 100 is coupled to a first piece of equipment 110 and a second piece of equipment 116. Also, the power electronics cooling circuit 100 is coupled to a radiator 102, an expansion tank 104, and a water pump 106. For example, the first piece of equipment 110 includes a driving motor of the vehicle, an inverter, a converter, or the like, and a second piece of equipment 116 includes a driving motor of the vehicle, an inverter, a converter, or the like.

A liquid (long life coolant (LLC)) flows through the power electronics cooling circuit 100. In FIG. 1, when a cooling fan 500 rotates, air produced by the cooling fan 500 hits the outdoor heat exchanger 202 of the refrigerant circuit 200 and the radiator 102. Note that while the vehicle is traveling, drag wind also hits the outdoor heat exchanger 202 and the radiator 102. With this arrangement, heat exchange is performed in the radiator 102, and the liquid passing through the radiator 102 is cooled.

As illustrated in FIG. 1, in the power electronics cooling circuit 100, liquid flows in the direction of the arrows according to the action of the water pump 106. The expansion tank 104 provided on the upstream side of the water pump 106 temporarily stores liquid and has a function of separating gas and liquid fluid.

The liquid flowing through the power electronics cooling circuit 100 is divided in two directions at a branch 122 and supplied to each of the first piece of equipment 110 and the second piece of equipment 116. With this arrangement, the first piece of equipment 110 and the second piece of equipment 116 are cooled. The liquid flowing through the power electronics cooling circuit 100 is returned to the radiator 102.

1.2. Configuration of Refrigerant Circuit

The refrigerant circuit 200 is coupled to an outdoor heat exchanger 202, a low-voltage solenoid valve 204, a chiller expansion valve 206, an accumulator 208, a motorized compressor 210, a water-cooled condenser bypass solenoid valve 212, a high-voltage solenoid valve 214, a heating solenoid valve 216, a cooling expansion valve 217, an evaporator 218, a check valve 220, a water-cooled condenser 306, and a chiller 408.

When a cooling fan 500 rotates, air produced by the cooling fan 500 hits the outdoor heat exchanger 202 of the refrigerant circuit 200. With this arrangement, heat is exchanged at the outdoor heat exchanger 202, and refrigerant flowing through the outdoor heat exchanger 202 is cooled.

Also, as illustrated in FIG. 1, in the refrigerant circuit 200, refrigerant flows in the direction of the arrows according to the action of the motorized compressor 210. The accumulator 208 provided on the upstream side of the motorized compressor 210 has a function of separating gas and liquid refrigerant.

In the refrigerant circuit 200, refrigerant compressed by the motorized compressor 210 is cooled by the outdoor heat exchanger 202, and by being injected into the evaporator 218 by the cooling expansion valve 217, the refrigerant gasifies and cools the evaporator 218. Subsequently, air 10 sent to the evaporator 218 is cooled, and by introducing this air 10 into the passenger compartment, the passenger compartment is cooled. The refrigerant circuit 200 principally cools, dehumidifies, and heats the passenger compartment.

Additionally, in the embodiment, the refrigerant circuit 200 also regulates the temperature of a high-voltage battery 410. The regulation of the temperature of the high-voltage battery 410 by the refrigerant circuit 200 will be described in detail later.

1.3. Configuration of Heating Circuit

The heating circuit 300 is coupled to a high-voltage heater 302, a heater core 304, the water-cooled condenser 306, a water pump 308, and a three-way valve 310. Also, the heating circuit 300 is coupled to three-way valves 404 and 412 of the battery temperature regulation circuit 400 via channels 312 and 314. The heating circuit 300 principally heats the passenger compartment. Additionally, in the embodiment, the heating circuit 300 also regulates the temperature of the high-voltage battery 410.

In the heating circuit 300, a liquid (LLC) for heating flows. The liquid flows in the direction of the arrows according to the action of the water pump 308. When the high-voltage heater 302 acts, the liquid is warmed by the high-voltage heater 302. The air 10 sent to the evaporator 218 hits the heater core 304. The air 10 sent to the evaporator 218 is warmed by the heater core 304 and introduced into the passenger compartment. With this arrangement, the passenger compartment is heated. The evaporator 218 and the heater core 304 may also be configured as a singular device.

The water-cooled condenser 306 exchanges heat between the heating circuit 300 and the refrigerant circuit 200. The regulation of the temperature of the high-voltage battery 410 by the heating circuit 300 will be described in detail later.

1.4. Configuration of Battery Temperature Regulation Circuit

The battery temperature regulation circuit 400 is coupled to a water pump 402, the three-way valve 404, an expansion tank 406, the chiller 408, the high-voltage battery 410, and the three-way valve 412. The battery temperature regulation circuit 400 regulates the temperature of the high-voltage battery 410.

In the battery temperature regulation circuit 400, a liquid (LLC) for regulating the temperature of the high-voltage battery 410 flows. The liquid flows in the direction of the arrows according to the action of the water pump 402. The liquid is introduced into the chiller 408. The chiller 408 exchanges heat between the liquid flowing through the battery temperature regulation circuit 400 and the refrigerant flowing through the refrigerant circuit 200. The expansion tank 406 is a tank that temporarily stores liquid.

As described above, the battery temperature regulation circuit 400 also regulates the temperature of the high-voltage battery 410. The regulation of the temperature of the high-voltage battery 410 by the battery temperature regulation circuit 400 will be described in detail later.

1.5. Regulation of Temperature of High-Voltage Battery

When the temperature of the high-voltage battery 410 rises moderately, the electric power generated by the high-voltage battery 410 increases. In the embodiment, by regulating the temperature of the high-voltage battery 410 with the refrigerant circuit 200 and the heating circuit 300, it is possible to regulate the temperature of the high-voltage battery 410 optimally and cause the high-voltage battery 410 to exhibit high output. For example, when starting the vehicle in the winter or the like, since the high-voltage battery 410 is cold, it may not be possible to exhibit sufficient output in some cases. Also, when charging the high-voltage battery 410, the high-voltage battery 410 generates heat, and the temperature of the high-voltage battery 410 may rise excessively in some cases. Likewise in such cases, by regulating the temperature of the high-voltage battery 410 with the refrigerant circuit 200 and the heating circuit 300, it is possible to regulate the temperature of the high-voltage battery 410 optimally. Note that the regulation of the temperature of the high-voltage battery 410 preferably is executed according to a feedback control based on a measured value of the temperature of the high-voltage battery 410.

2. Exemplary Operations of Heat Management System

Next, the operations of the heat management system 1000 configured as above will be described. To cool, dehumidify, and heat the passenger compartment and also to regulate the temperature of the high-voltage battery 410, various types of heat exchange are performed. In the following, these operations in the heat management system will be described. Note that each operation is merely an example, and the control for achieving each operation is not limited to what is given as an example. In the following description, the operating states of the low-voltage solenoid valve 204, the chiller expansion valve 206, the water-cooled condenser bypass solenoid valve 212, the high-voltage solenoid valve 214, the heating solenoid valve 216, the three-way valve 310, the three-way valve 404, and the three-way valve 412 will be illustrated in the diagrams as solid white to denote the open state and as solid black to denote the closed state.

2.1. Cooling Passenger Compartment

Figure 2:
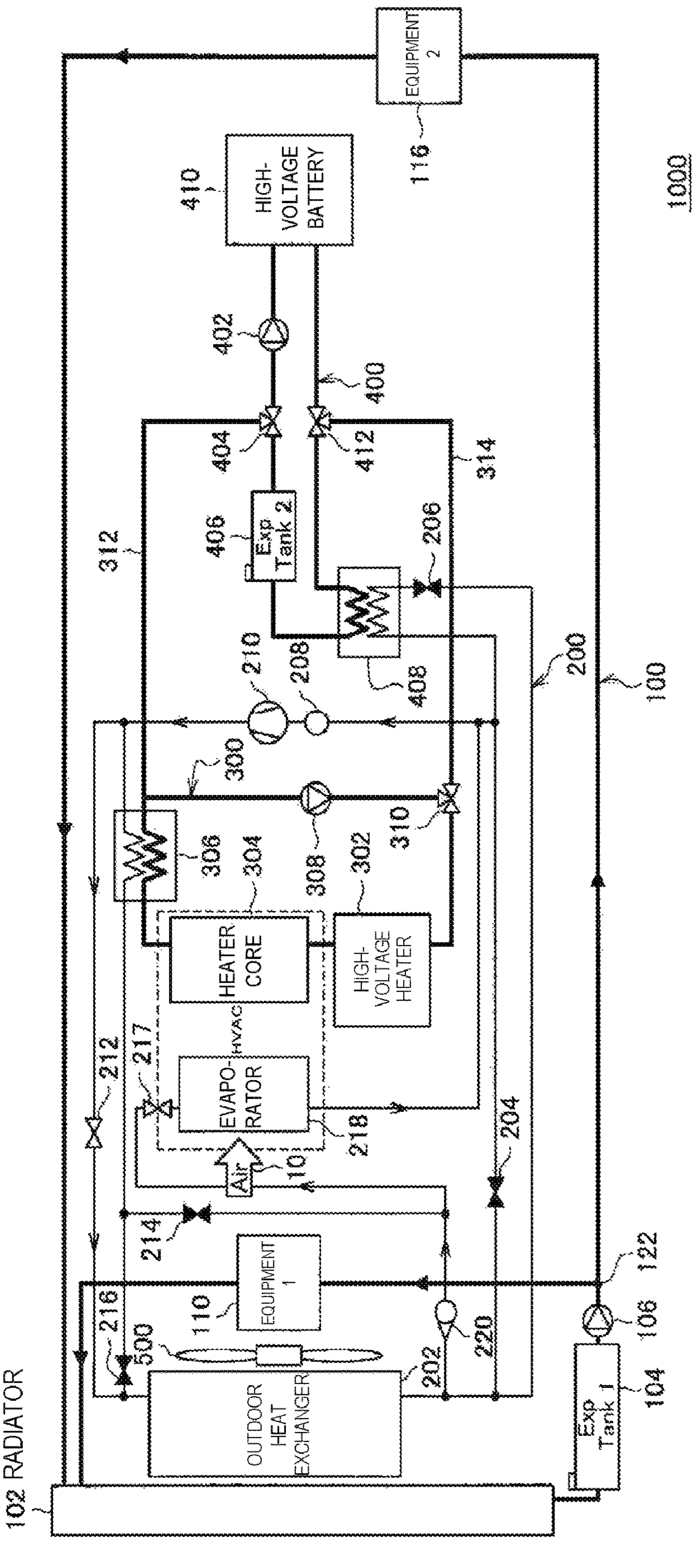
FIG. 2 is a schematic diagram illustrating operations when cooling a passenger compartment.

FIG. 2 is a schematic diagram illustrating operations when cooling the passenger compartment. Cooling of the passenger compartment is performed by the refrigerant circuit 200. FIG. 2 illustrates a state in which the heating circuit 300 and the battery temperature regulation circuit 400 are stopped. The refrigerant in the refrigerant circuit 200 flows in the direction indicated by the arrows in FIG. 2. As described above, air 10 sent to the evaporator 218 is cooled by the evaporator 218, and by introducing this air 10 into the passenger compartment, the passenger compartment is cooled.

2.2. Cooling High-Voltage Battery

Figure 3:
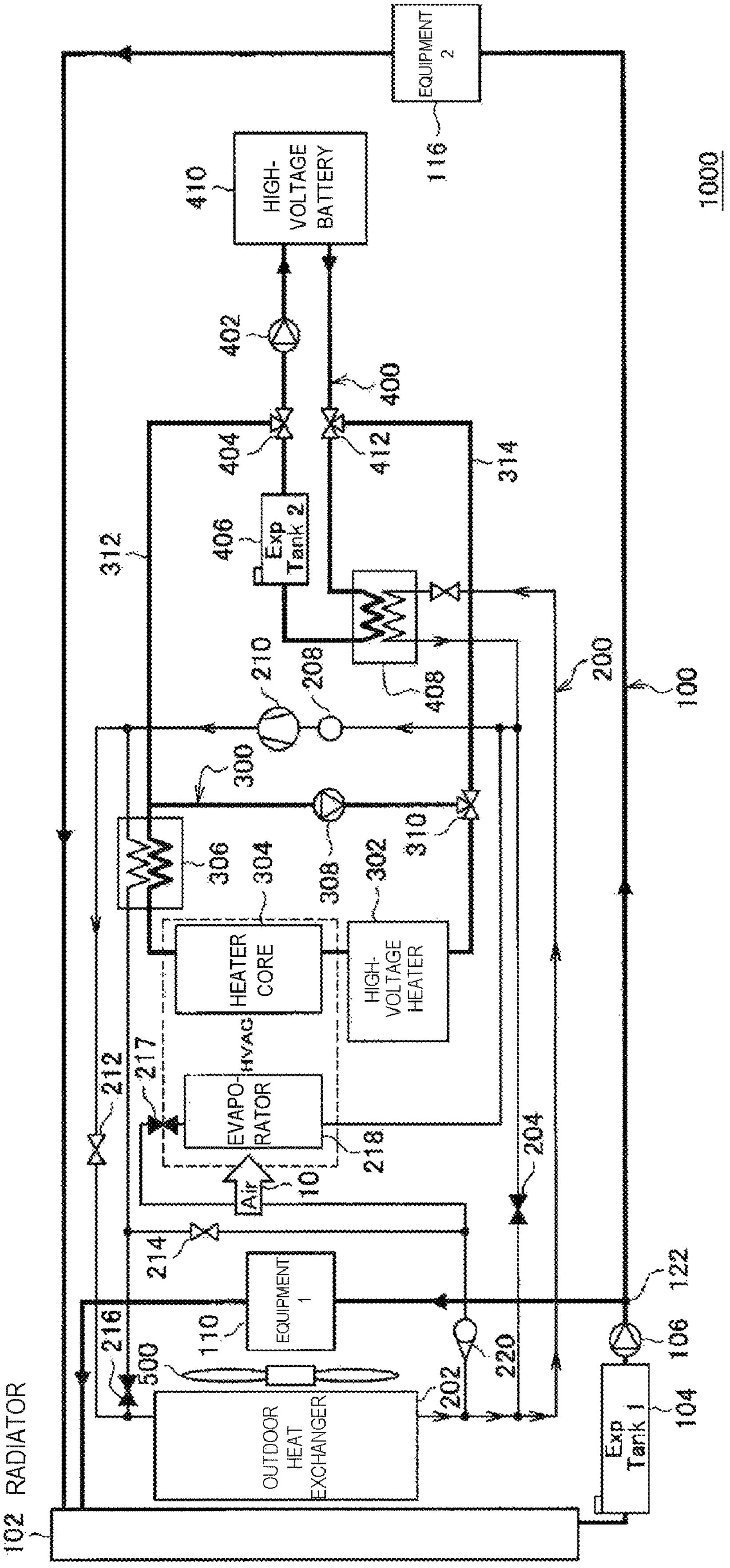
FIG. 3 is a schematic diagram illustrating operations when cooling a high-voltage battery.

FIG. 3 is a schematic diagram illustrating operations when cooling the high-voltage battery 410. In FIG. 3, the cooling of the high-voltage battery 410 is achieved by causing the refrigerant flowing through the refrigerant circuit 200 and the liquid flowing through the battery temperature regulation circuit 400 to exchange heat with each other in the chiller 408. Refrigerant compressed by the motorized compressor 210 is cooled by the outdoor heat exchanger 202, and by being injected into the chiller 408 by the chiller expansion valve 206, the refrigerant gasifies and cools the chiller 408. With this arrangement, the liquid flowing through the battery temperature regulation circuit 400 is cooled by the refrigerant flowing through the refrigerant circuit 200. FIG. 3 illustrates a state in which the heating circuit 300 is stopped.

2.3. Cooling Passenger Compartment and Cooling High-Voltage Battery

Figure 4:
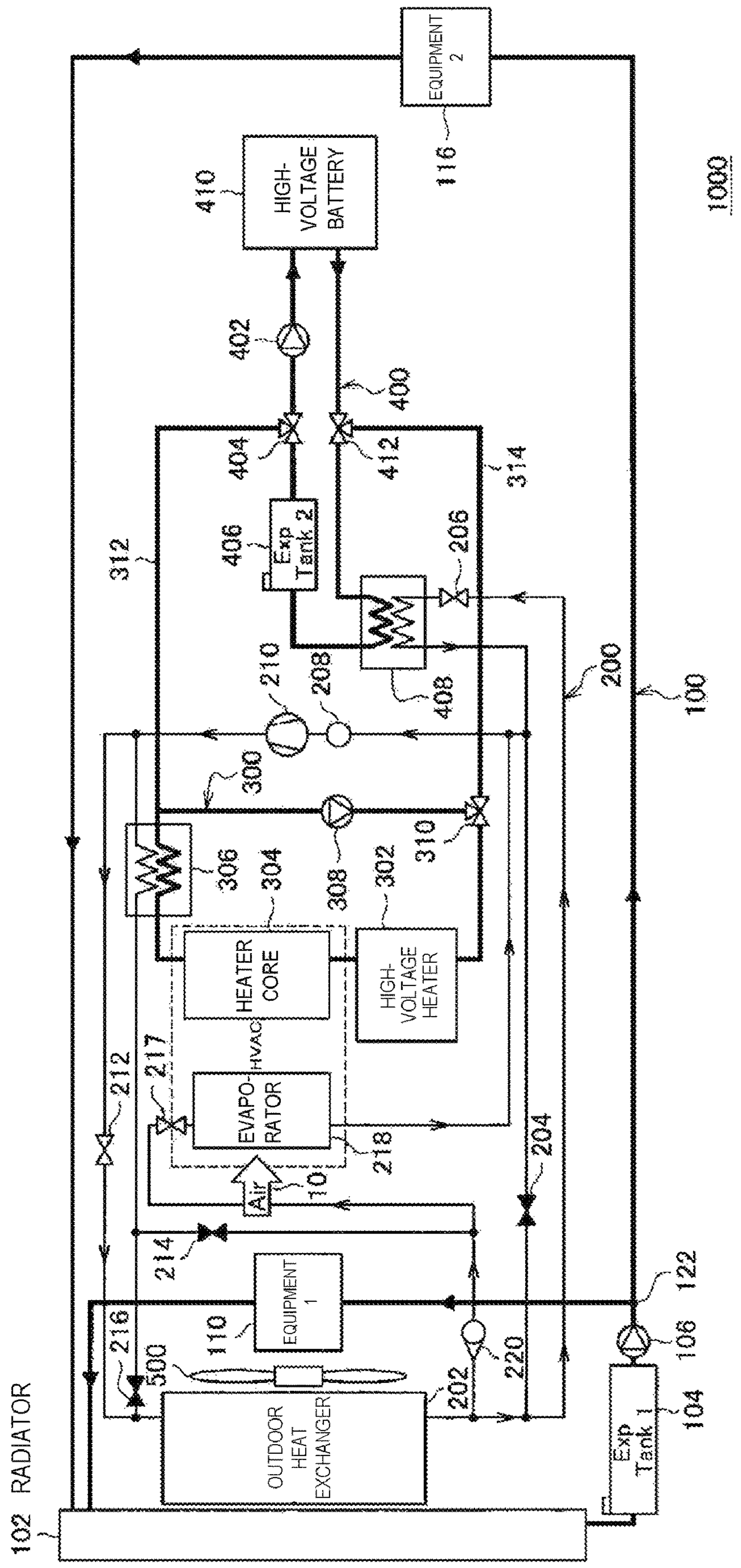
FIG. 4 is a schematic diagram illustrating operations in a case of both cooling the passenger compartment and also cooling the high-voltage battery.

FIG. 4 is a schematic diagram illustrating operations in a case of both cooling the passenger compartment and also cooling the high-voltage battery 410. By opening the chiller expansion valve 206 with respect to FIG. 2, the refrigerant flowing through the refrigerant circuit 200 and the liquid flowing through the battery temperature regulation circuit 400 exchange heat with each other in the chiller 408, and the high-voltage battery 410 is cooled. FIG. 4 illustrates a state in which the heating circuit 300 is stopped.

2.4. Dehumidifying Passenger Compartment

Figure 5:
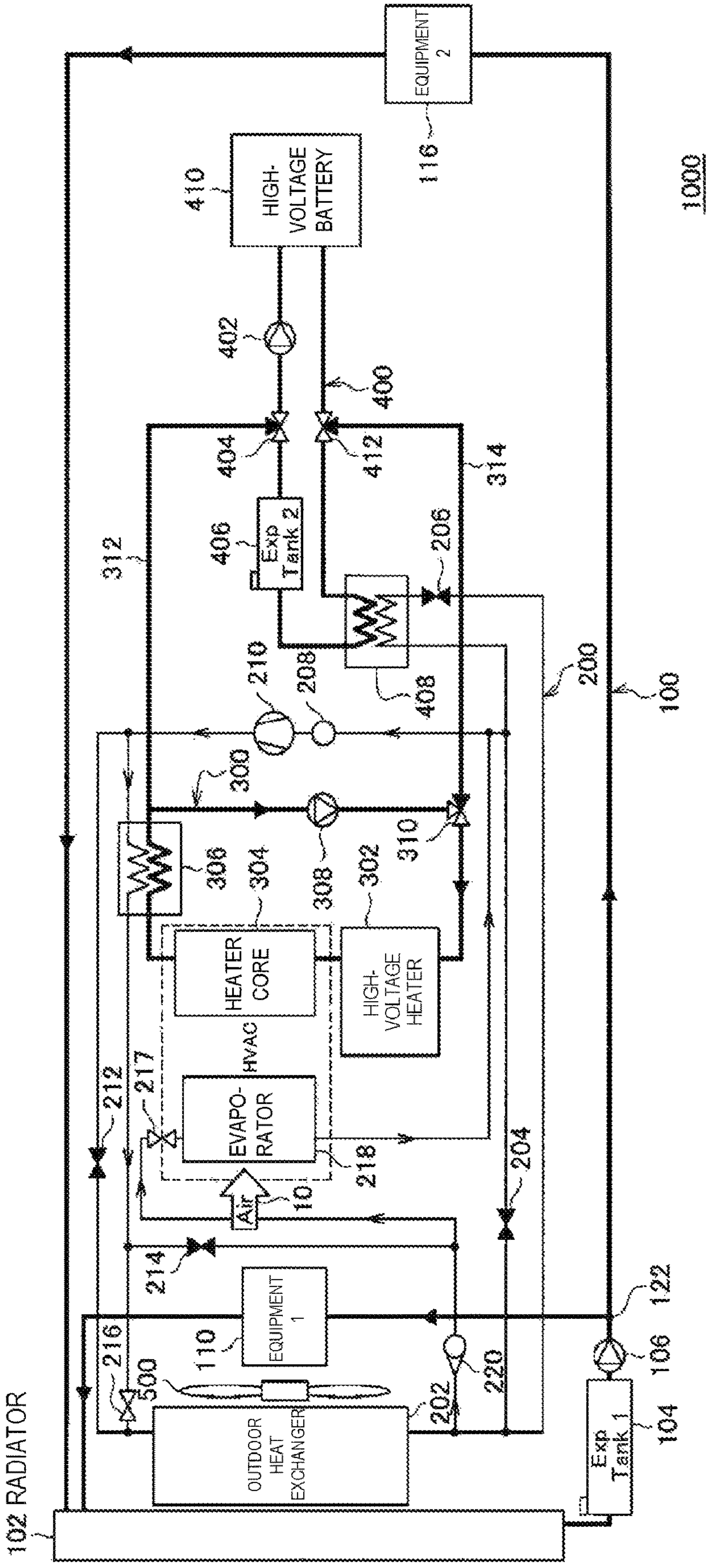
FIG. 5 is a schematic diagram illustrating operations when dehumidifying the passenger compartment.

FIG. 5 is a schematic diagram illustrating operations when dehumidifying the passenger compartment. FIG. 5 differs from FIG. 2 in that air that has been cooled and dehumidified by the evaporator 218 is reheated by the heater core 304. The refrigerant after exchanging heat in the evaporator 218 is in a high-temperature, high-pressure state. By causing liquid to flow through the heating circuit 300 by the action of the water pump 308 and causing the liquid in the heating circuit 300 to exchange heat with the high-temperature, high-pressure refrigerant at the water-cooled condenser 306, the liquid in the heating circuit 300 is heated. At this time, as illustrated in FIG. 5, by closing parts of the three-way valve 310, the three-way valve 404, and the three-way valve 412, the liquid in the heating circuit 300 does not flow into the battery temperature regulation circuit 400. The air dehumidified by the evaporator 218 is warmed by the heater core 304 and introduced into the passenger compartment. In conditions in which the liquid in the heating circuit 300 is not given enough heat from the refrigerant, the high-voltage heater 302 is turned on to heat the liquid in the heating circuit 300 further.

2.5. Dehumidifying and Heating Passenger Compartment (1)

Figure 6:
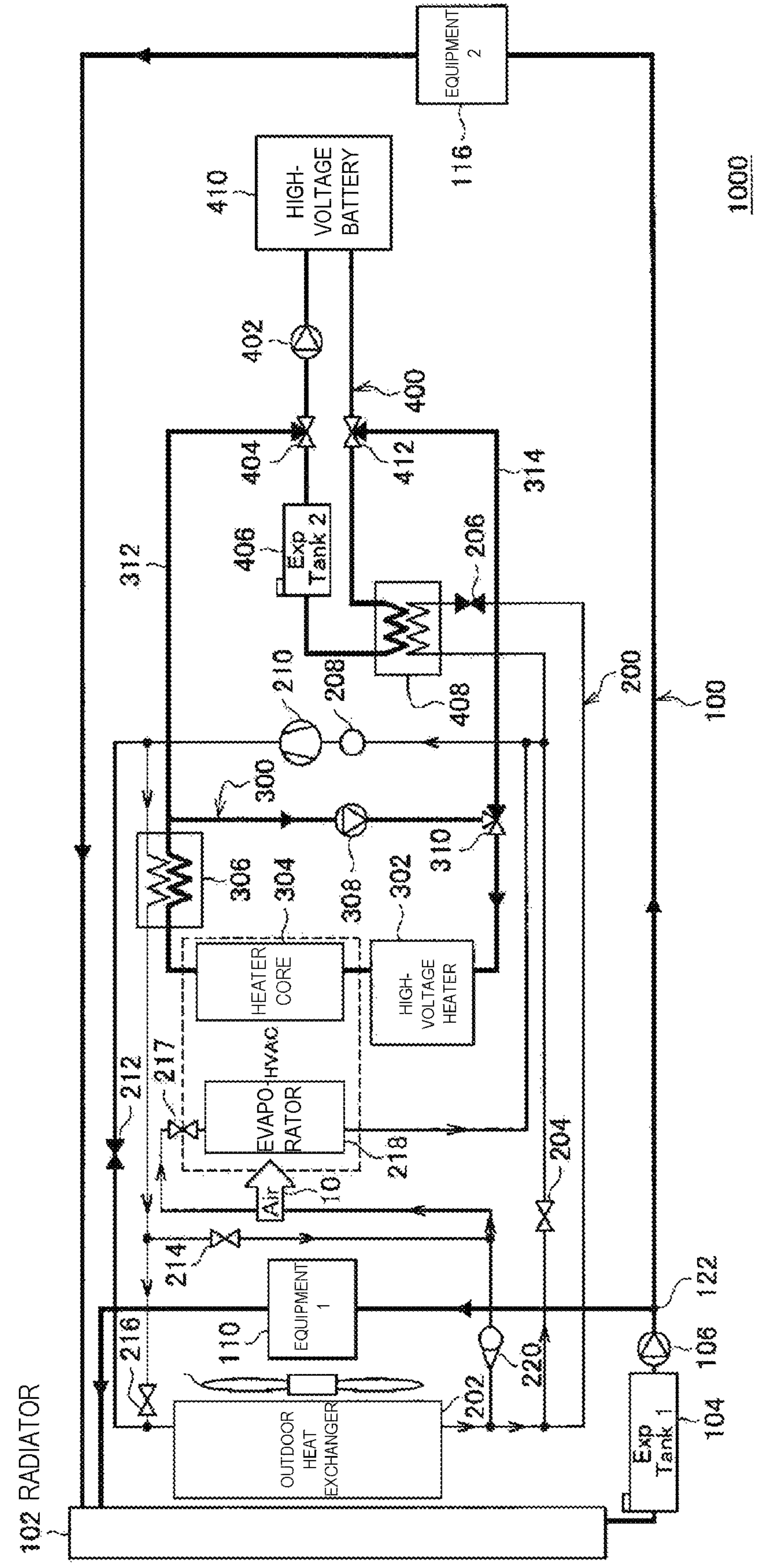
FIG. 6 is a schematic diagram illustrating operations when both dehumidifying and also heating the passenger compartment.

FIG. 6 is a schematic diagram illustrating operations when both dehumidifying and also heating the passenger compartment. In FIG. 6, a portion of the refrigerant in the refrigerant circuit 200 does not pass through the outdoor heat exchanger 202, and instead passes through the high-voltage solenoid valve 214 and is introduced into the evaporator 218. Liquid flows inside the heating circuit 300 by the action of the water pump 308, and the liquid flowing through the heating circuit 300 is warmed by the water-cooled condenser 306. With this arrangement, the air dehumidified by the evaporator 218 is warmed by the heater core 304 and introduced into the passenger compartment.

2.6. Dehumidifying and Heating Passenger Compartment (2)

Figure 7:
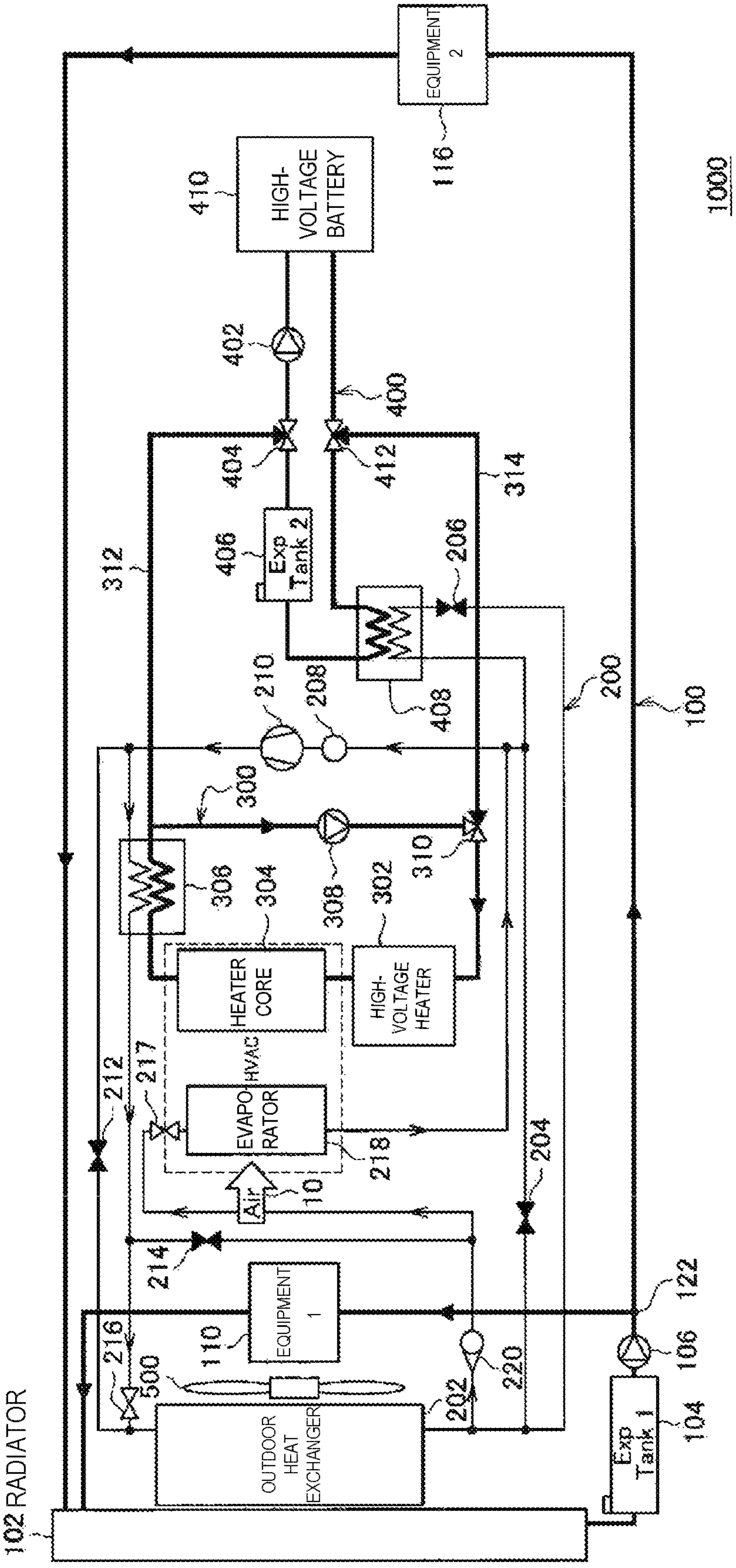
FIG. 7 is a schematic diagram illustrating a different example of operations when both dehumidifying and also heating the passenger compartment.

FIG. 7 is a schematic diagram illustrating a different example of operations when both dehumidifying and also heating the passenger compartment. The basic operations are similar to FIG. 6, but in FIG. 7, the high-voltage solenoid valve 214 and the low-voltage solenoid valve 204 are closed. The difference between FIGS. 6 and 7 is that, in FIG. 7, in the case in which the outdoor air temperature is low, the high-voltage heater 302 is turned on to ensure heating capacity when dehumidifying. On the other hand, in FIG. 6, in the case in which the outdoor air temperature is low, since the refrigerant bypasses the outdoor heat exchanger 202, it is possible to ensure heating capacity even without using the high-voltage heater 302. Note that, similarly to FIG. 5, FIGS. 6 and 7 illustrate a state in which the flow of liquid from the heating circuit 300 to the battery temperature regulation circuit 400 is stopped, and the battery temperature regulation circuit 400 is stopped.

2.7. Dehumidifying Passenger Compartment and Cooling High-Voltage Battery

Figure 8:
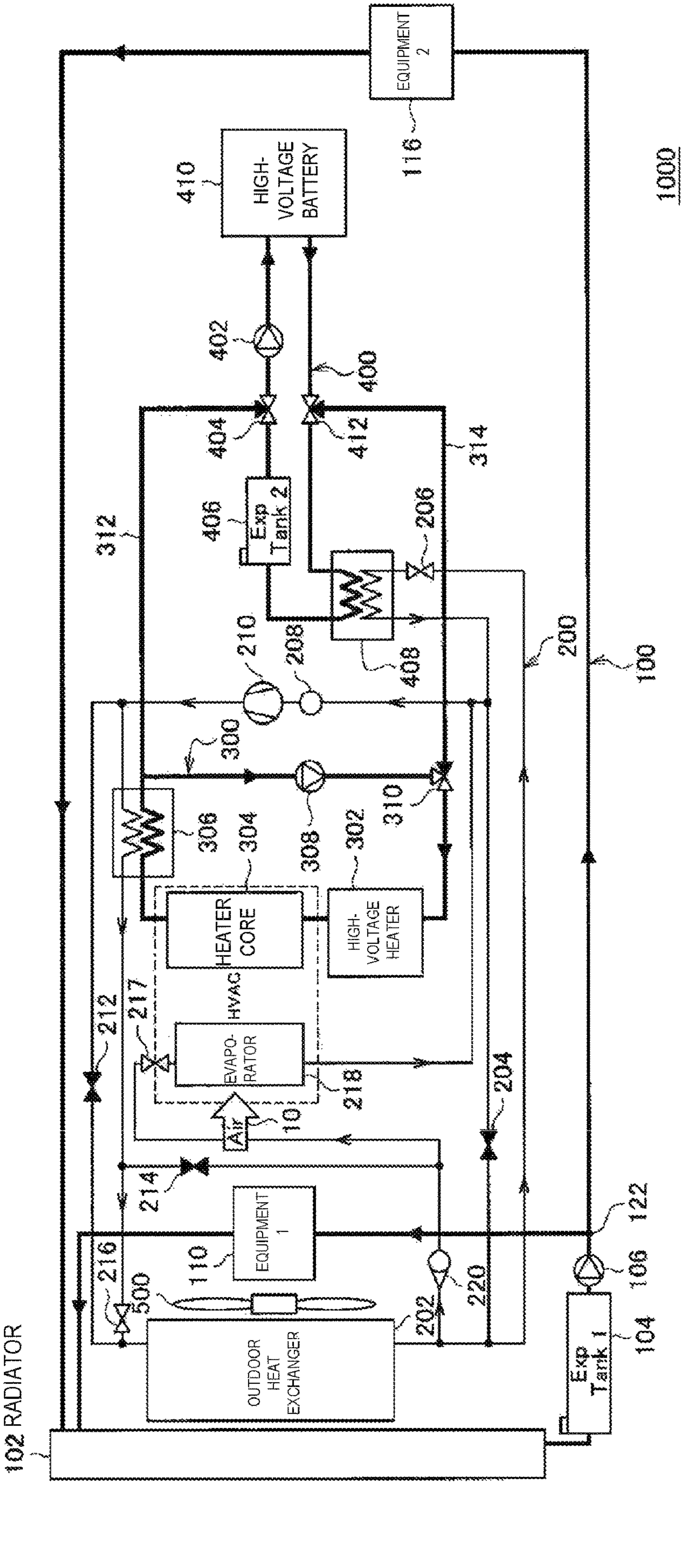
FIG. 8 is a schematic diagram illustrating the operations of both dehumidifying the passenger compartment and also cooling the high-voltage battery.

FIG. 8 is a schematic diagram illustrating the operations of both dehumidifying the passenger compartment and also cooling the high-voltage battery 410. With respect to FIG. 5, the chiller expansion valve 206 is opened. Refrigerant compressed by the motorized compressor 210 is cooled by the outdoor heat exchanger 202, and by being injected into the chiller 408 by the chiller expansion valve 206, the refrigerant gasifies and cools the chiller 408. The refrigerant flowing through the refrigerant circuit 200 and the liquid flowing through the battery temperature regulation circuit 400 exchange heat with each other in the chiller 408, and the high-voltage battery 410 is cooled. Dehumidification is performed similarly to FIG. 5.

2.8. Dehumidifying Passenger Compartment and Warming Up High-Voltage Battery

Figure 9:
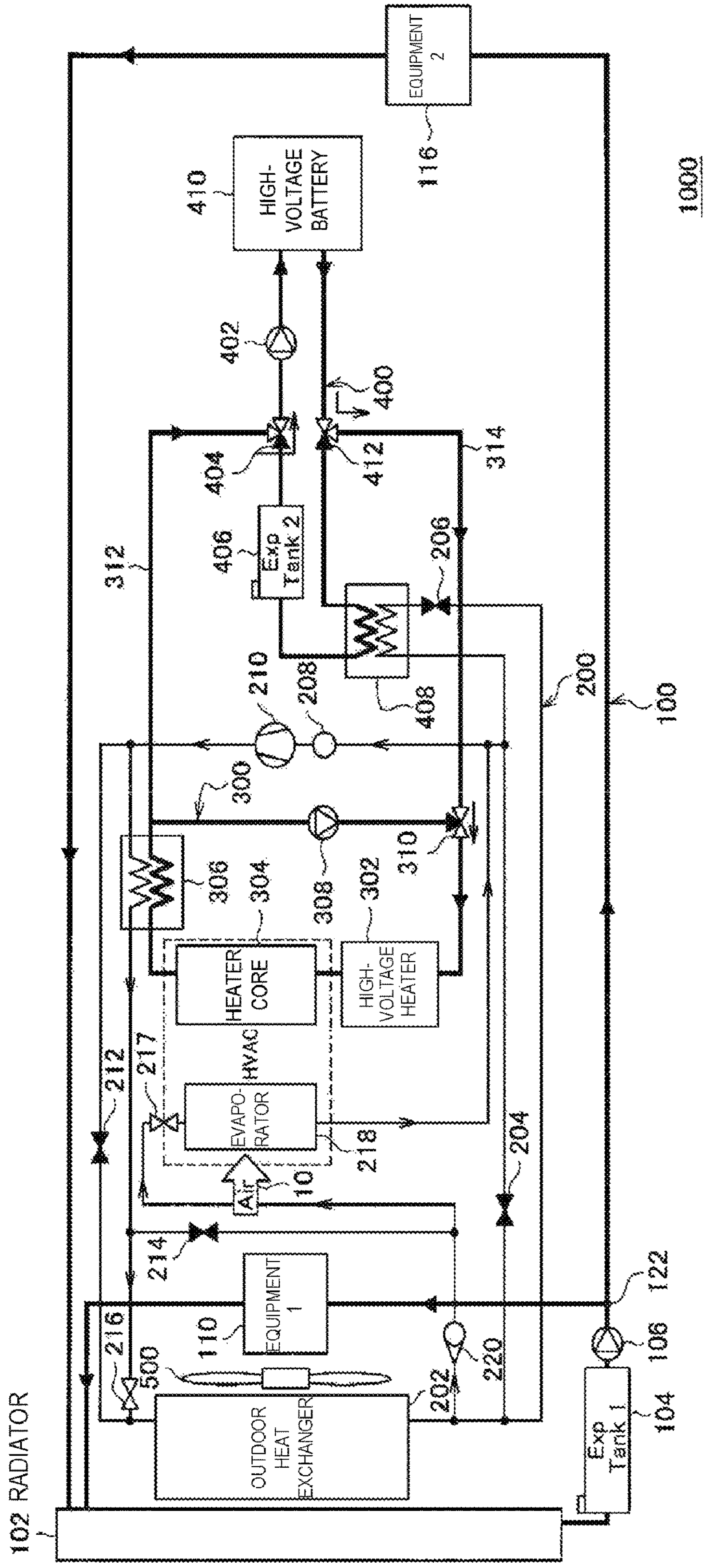
FIG. 9 is a schematic diagram illustrating the operations of both dehumidifying the passenger compartment and also warming up the high-voltage battery.

FIG. 9 is a schematic diagram illustrating the operations of both dehumidifying the passenger compartment and also warming up the high-voltage battery 410. The basic operations are similar to FIG. 5, but in FIG. 9, the liquid in the heating circuit 300 is introduced into the battery temperature regulation circuit 400. For this reason, in the three-way valve 310 of the heating circuit 300 and the three-way valves 404 and 412 of the battery temperature regulation circuit 400, each valve is controlled such that liquid flows in the direction of the arrows. The liquid in the battery temperature regulation circuit 400 and the heating circuit 300 flows in the direction of the arrows by the action of the water pump 402. By introducing the liquid in the heating circuit 300 into the battery temperature regulation circuit 400, it is possible to warm up the high-voltage battery 410. The air dehumidified by the evaporator 218 is warmed by the heater core 304 and introduced into the passenger compartment. In conditions in which the liquid in the heating circuit 300 is not given enough heat from the refrigerant, the high-voltage heater 302 is turned on to heat the liquid in the heating circuit 300 further.

2.9. Heating Passenger Compartment with Heat Pump Configuration

Figure 10:
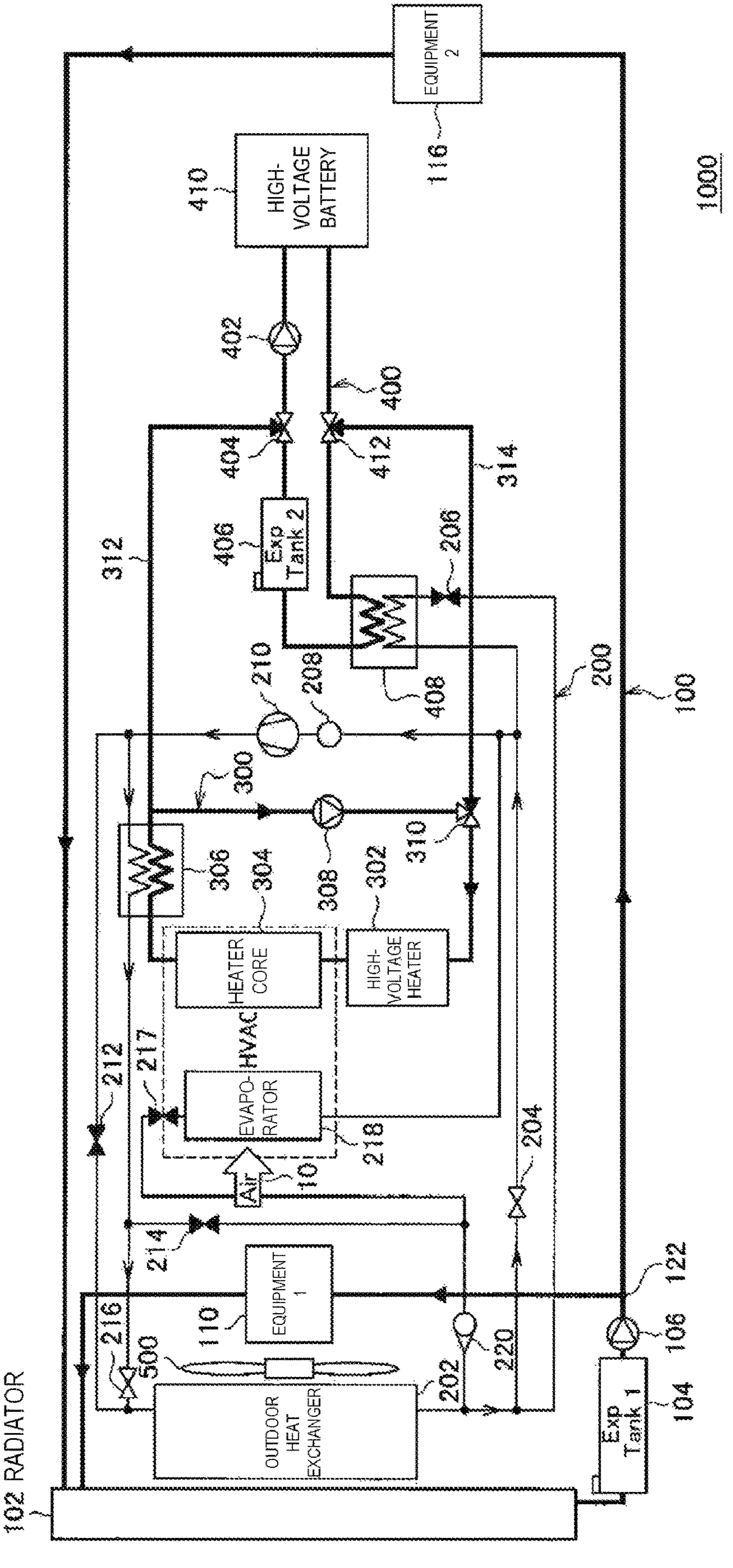
FIG. 10 is a schematic diagram illustrating the operations of heating the passenger compartment with a heat pump configuration.

FIG. 10 is a schematic diagram illustrating the operations of heating the passenger compartment with a heat pump configuration. By putting the refrigerant in a high-temperature, high-pressure state with the motorized compressor 210 and causing the liquid in the heating circuit 300 to exchange heat with the high-temperature, high-pressure refrigerant at the water-cooled condenser 306, the liquid in the heating circuit 300 is heated. Similarly to FIG. 5, the flow of liquid from the heating circuit 300 to the battery temperature regulation circuit 400 is stopped, and the battery temperature regulation circuit 400 is stopped. The air to be introduced into the passenger compartment is warmed by the heater core 304. In conditions in which the liquid in the heating circuit 300 is not given enough heat from the refrigerant, the high-voltage heater 302 is turned on to heat the liquid in the heating circuit 300 further.

2.10. Heating Passenger Compartment with High-Voltage Heater

Figure 11:
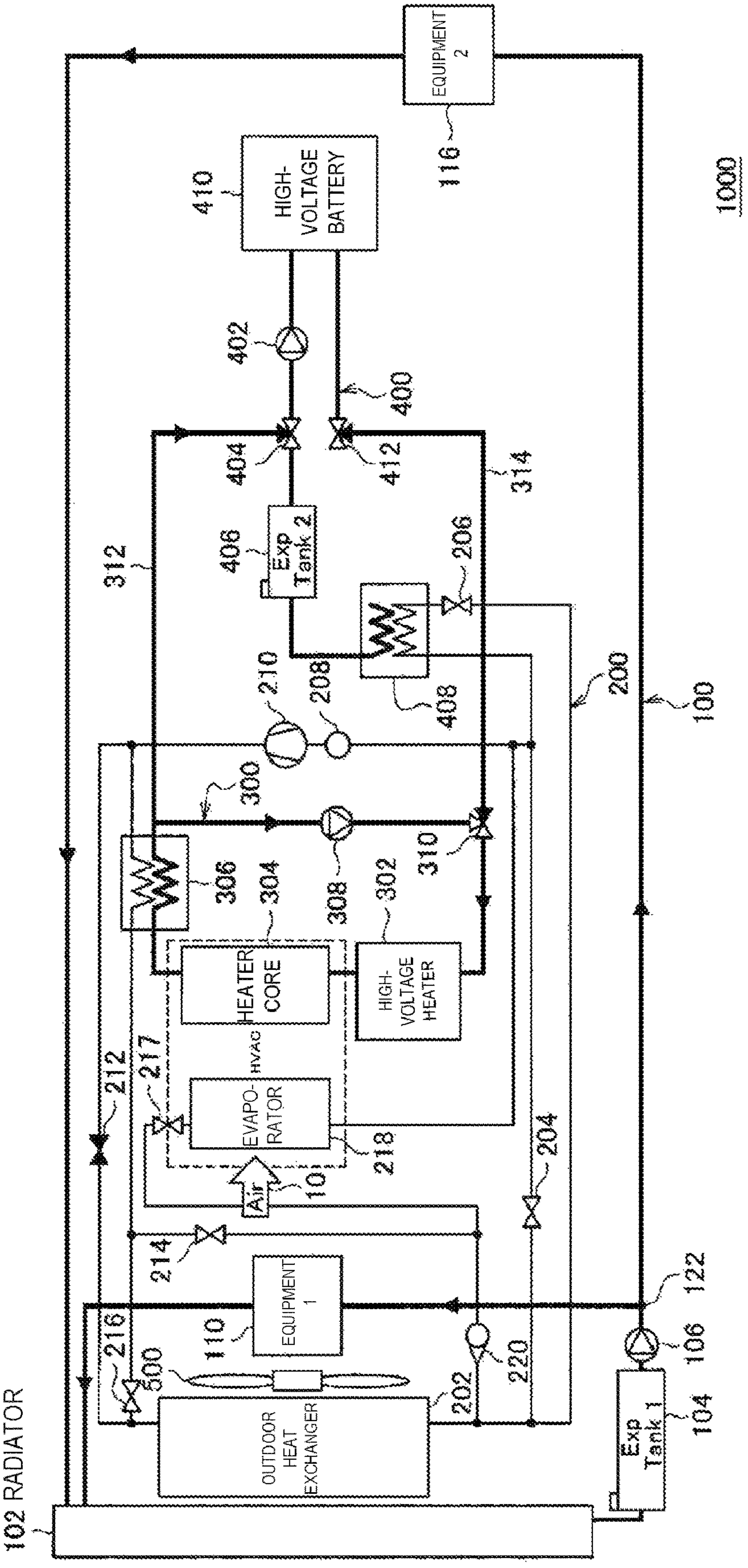
FIG. 11 is a schematic diagram illustrating the operations of heating the passenger compartment with a high-voltage heater.

FIG. 11 is a schematic diagram illustrating the operations of heating the passenger compartment with the high-voltage heater 302. By causing liquid in the heating circuit 300 to be heated by the high-voltage heater 302 and to exchange heat in the heater core 304, the passenger compartment is heated. The refrigerant circuit 200 is in a stopped state. Also, the flow of liquid from the heating circuit 300 to the battery temperature regulation circuit 400 is stopped, and the battery temperature regulation circuit 400 is stopped.

2.11. Warming Up High-Voltage Battery with Heat Pump

Figure 12:
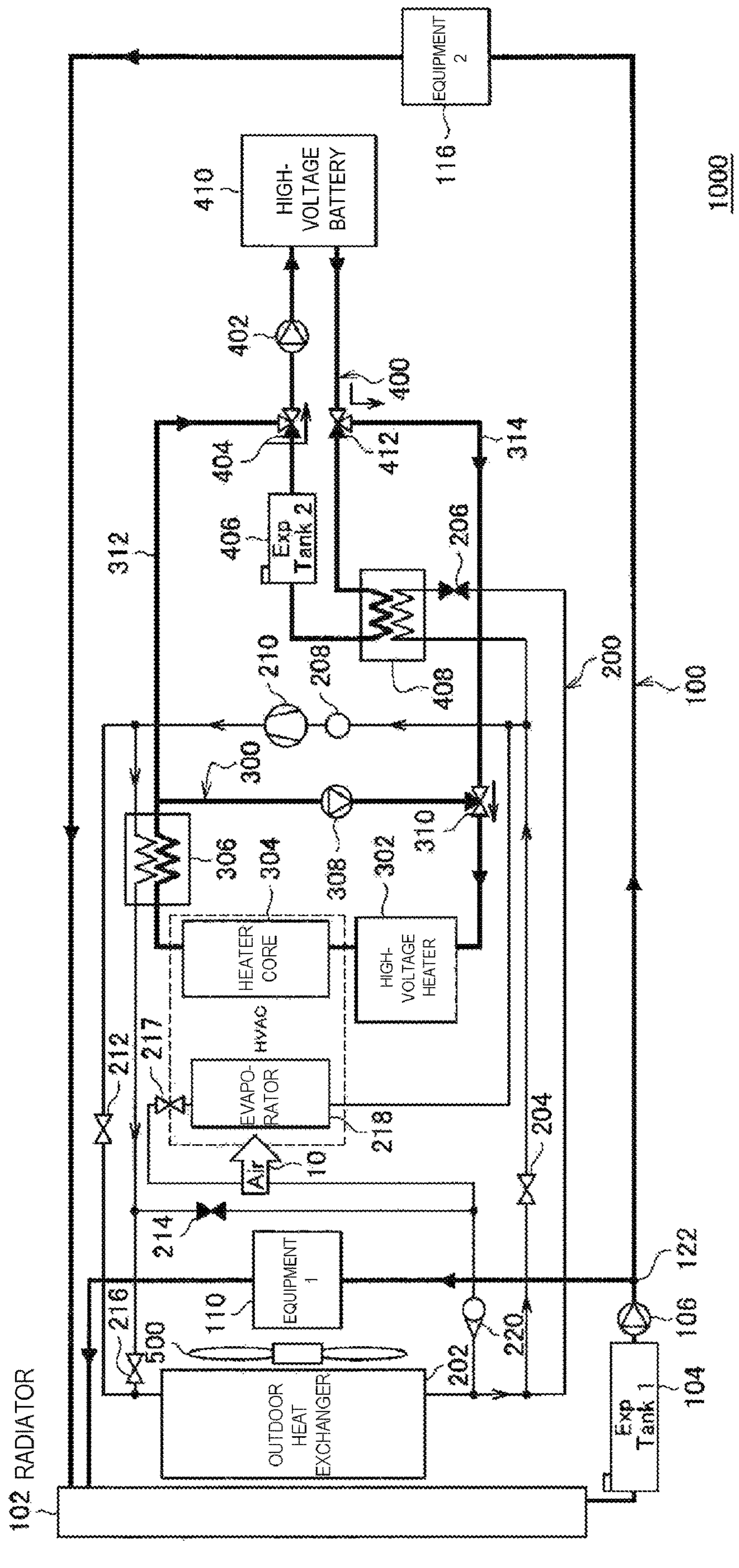
FIG. 12 is a schematic diagram illustrating the operations of warming up the high-voltage battery with a heat pump.

FIG. 12 is a schematic diagram illustrating the operations of warming up the high-voltage battery 410 with a heat pump. The basic operations are similar to FIG. 10, but in FIG. 12, the liquid in the heating circuit 300 is introduced into the battery temperature regulation circuit 400. For this reason, in the three-way valve 310 of the heating circuit 300 and the three-way valves 404 and 412 of the battery temperature regulation circuit 400, each valve is controlled such that liquid flows in the direction of the arrows. The liquid in the battery temperature regulation circuit 400 and the heating circuit 300 flows in the direction of the arrows by the action of the water pump 402. When warming up the high-voltage battery 410 with a heat pump, by putting the refrigerant in a high-temperature, high-pressure state with the motorized compressor 210 and causing the liquid in the heating circuit 300 to exchange heat with the high-temperature, high-pressure refrigerant at the water-cooled condenser 306, the liquid in the heating circuit 300 is heated. For this reason, the high-voltage heater 302 remains in the stopped state unless the outdoor air temperature becomes extremely cold (for example, −10° C. or less) Consequently, power consumption may be suppressed, and energy usage efficiency may be raised.

As above, by basically using the refrigerant circuit 200 to exchange heat between refrigerant and air inside the passenger compartment and also to exchange heat between refrigerant and the liquid in the battery temperature regulation circuit 400, temperature regulation (cooling, heating) of the passenger compartment and temperature regulation of the high-voltage battery 410 are achieved. Furthermore, at extremely low temperatures, by coupling the heating circuit 300 and the battery temperature regulation circuit 400 to put both on the same circuit, it becomes possible to meet the temperature demand even at extremely low temperatures.

2.12. Warming Up High-Voltage Battery with High-Voltage Heater

Figure 13:
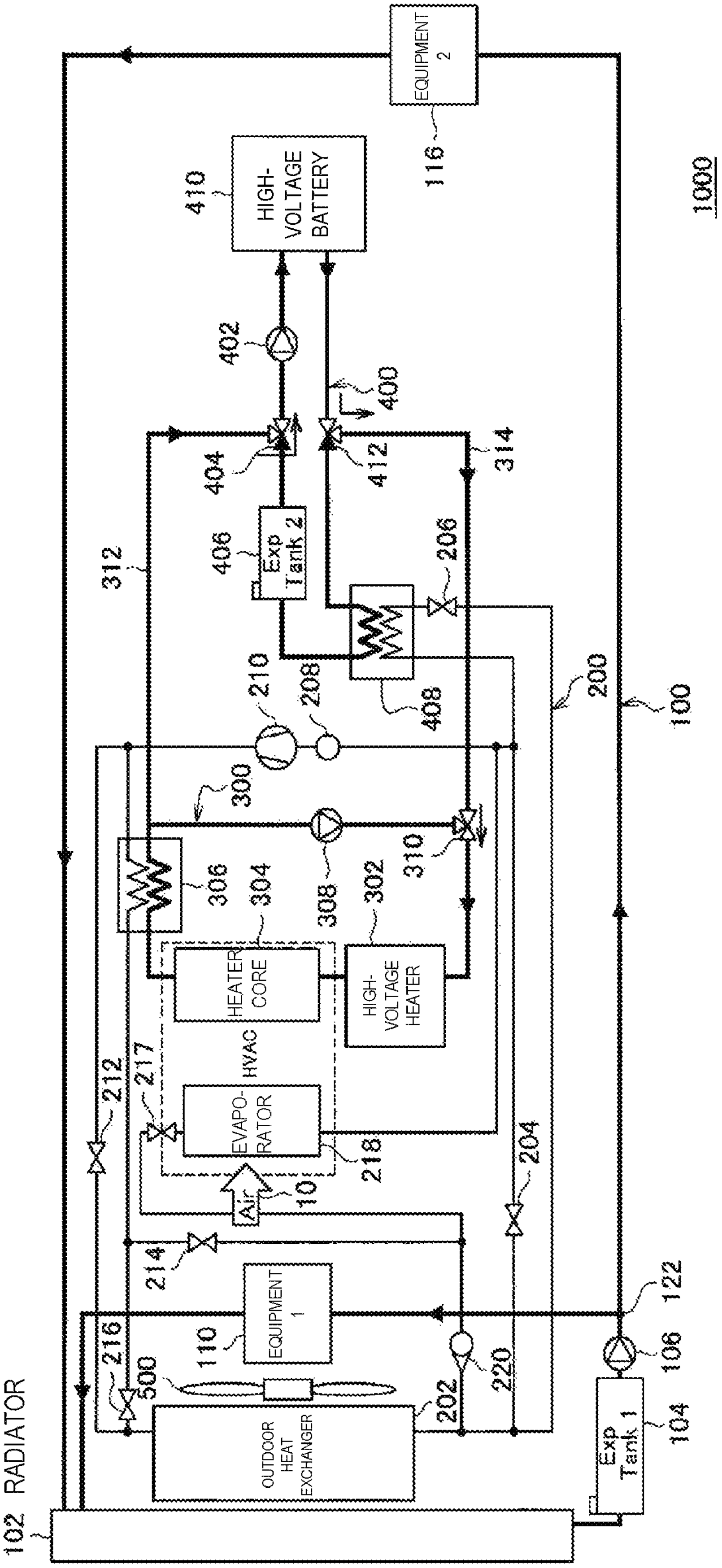
FIG. 13 is a schematic diagram illustrating the operations of warming up the high-voltage battery with a high-voltage heater.

FIG. 13 is a schematic diagram illustrating the operations of warming up the high-voltage battery 410 with the high-voltage heater 302. By causing the liquid in the heating circuit 300 to be heated by the high-voltage heater 302 and introduced into the battery temperature regulation circuit 400, the high-voltage battery 410 is warmed up. The refrigerant circuit 200 is in a stopped state. Likewise in FIG. 13, in the three-way valve 310 of the heating circuit 300 and the three-way valves 404 and 412 of the battery temperature regulation circuit 400, each valve is controlled such that liquid flows in the direction of the arrows. The liquid in the battery temperature regulation circuit 400 and the heating circuit 300 flows in the direction of the arrows by the action of the water pump 402.

3. Regulation of Temperature of High-Voltage Battery by Coolant of Power Electronics Cooling Circuit As above, in the heat management system 1000, the refrigerant circuit 200, the heating circuit 300, and the battery temperature regulation circuit 400 may be used to regulate the temperature of the high-voltage battery 410. Additionally, in the embodiment, it is also possible to regulate the temperature of the high-voltage battery 410 with the liquid flowing through the power electronics cooling circuit 100.

Figure 14:
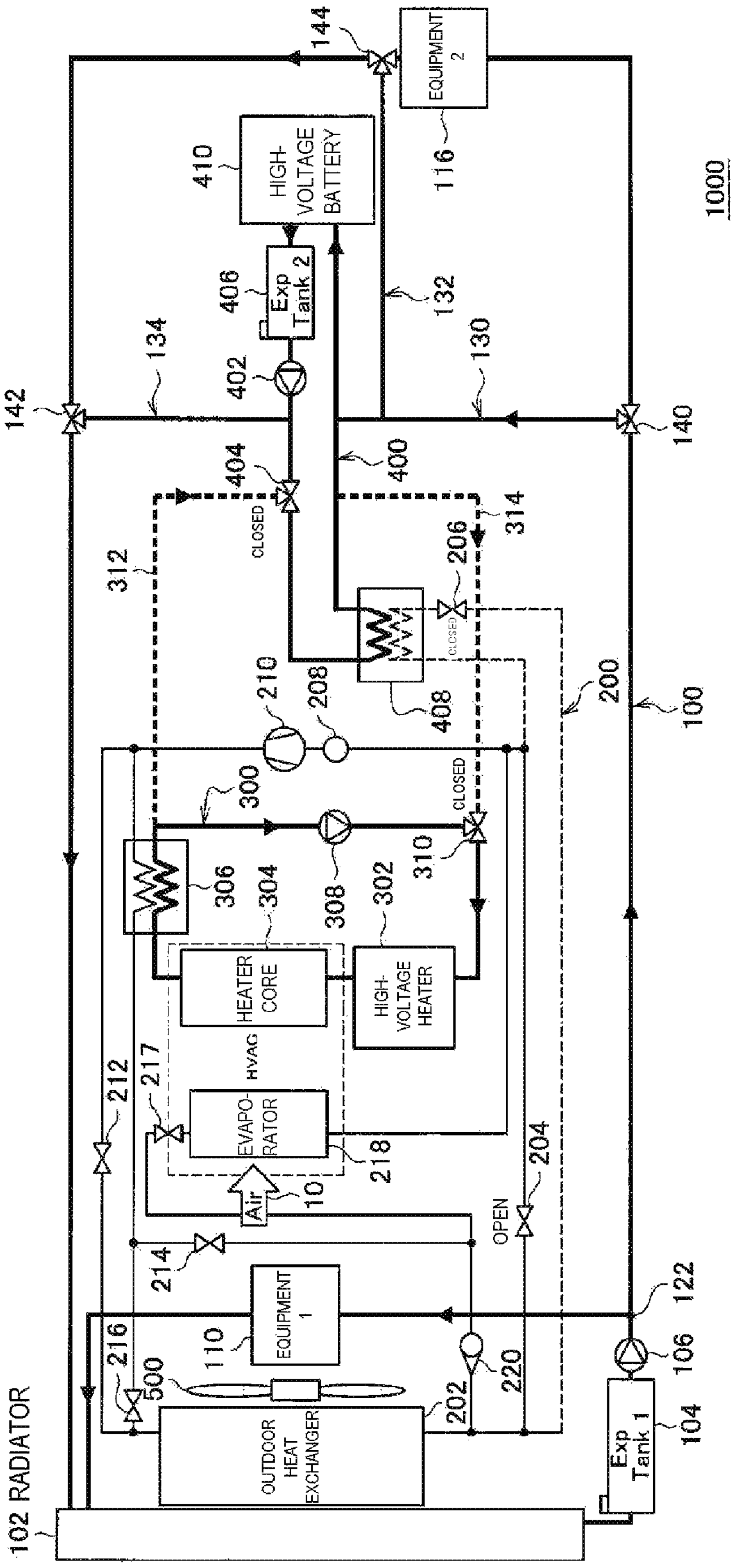
FIG. 14 is a schematic diagram illustrating an example of adding bypass water channels to the configuration of the power electronics cooling circuit illustrated in FIG. 1.

FIG. 14 is a schematic diagram illustrating an example of adding bypass water channels 130, 132, 134 and bypass three-way valves 140, 142, 144 to the configuration of the power electronics cooling circuit 100 illustrated in FIG. 1. The bypass water channels 130, 132, and 134 couple the power electronics cooling circuit 100 and the battery temperature regulation circuit 400. Also, in the configuration illustrated in FIG. 14, the expansion tank 406 of the battery temperature regulation circuit 400 is provided between the high-voltage battery 410 and the water pump 402. The same applies to FIGS. 15 and 16 described later.

With the configuration illustrated in FIG. 14, it becomes possible to cause the coolant for the power electronics (powertrain) cooled by the radiator 102 to flow through the battery temperature regulation circuit 400. Specifically, by switching channels using the bypass three-way valves 140, 142, and 144, the coolant for the power electronics may be used to regulate the temperature of the high-voltage battery 410.

The coolant flowing through the power electronics cooling circuit 100 normally is at a higher temperature than the liquid flowing through the battery temperature regulation circuit 400. Consequently, the coolant for the power electronics may be used to warm up the high-voltage battery 410. As described above, when the temperature of the high-voltage battery 410 rises moderately, the electric power generated by the high-voltage battery 410 increases. Consequently, by using the coolant for the power electronics to warm up the high-voltage battery 410, it is possible to regulate the temperature of the high-voltage battery 410 optimally and cause the high-voltage battery 410 to exhibit high output.

On the other hand, in the case in which the temperature of the coolant flowing through the power electronics cooling circuit 100 is lower than the temperature of the liquid flowing through the battery temperature regulation circuit 400, it is also possible to use the coolant for the power electronics to cool the high-voltage battery 410. For example, since the high-voltage battery 410 generates when being charged, the coolant for the power electronics that has exchanged heat with outdoor air at the radiator 102 may be at a lower temperature than the liquid flowing through the battery temperature regulation circuit 400 in some cases. In such cases, by introducing the coolant for the power electronics into the battery temperature regulation circuit 400, the high-voltage battery 410 may be cooled.

Also, in the case of using the coolant for the power electronics to warm up the high-voltage battery 410, compared to the case of warming up the temperature of the high-voltage battery 410 according to the procedures described in FIGS. 9, 12, and 13, since the refrigerant circuit 200 and the heating circuit 300 are not used, power consumption may be reduced. More specifically, in the case of using the coolant for the power electronics to warm up the high-voltage battery 410, power is consumed only by the water pump 106. On the other hand, in the case of using the refrigerant circuit 200 and the heating circuit 300, since the motorized compressor 210, the water pump 308, the high-voltage heater 302, and the like act, the power consumption increases. Consequently, by using the coolant for the power electronics to warm up the high-voltage battery 410, it is possible to greatly reduce power consumption.

Furthermore, in the case of using the coolant for the power electronics to warm up the high-voltage battery 410, the coolant for the power electronics that has already reached a high temperature may be used to warm up the high-voltage battery 410 in a short time. Consequently, it is possible to shorten the arrival time at which the high-voltage battery 410 arrives at the target temperature.

In particular, in the case of causing the high-voltage heater 302 to act to warm up the high-voltage battery 410, power consumption by the high-voltage heater 302 increases, the driving output drops, and there is a possibility that cruising radius of the vehicle will be reduced. On the other hand, with the coolant flowing through the power electronics cooling circuit 100, since the first piece of equipment 110 and the second piece of equipment 116 generate heat due to vehicle travel, it is possible to utilize the heat generated by vehicle travel effectively to warm up the high-voltage battery 410. Consequently, in the case of using the coolant for the power electronics to warm up the high-voltage battery 410, energy loss basically does not occur.

With this arrangement, when causing the vehicle to travel in a low-temperature environment, such as during winter for example, it is possible to warm up the high-voltage battery 410 in a short time and cause the high-voltage battery 410 to exhibit the desired output.

Note that in cases where using the refrigerant circuit 200 or the heating circuit 300 to warm up the high-voltage battery 410 consumes less power than using the coolant for the power electronics to warm up the high-voltage battery 410, it is preferable to use the refrigerant circuit 200 or the heating circuit 300 to warm up the high-voltage battery 410.

3.1. Case of not Using Waste Heat from Second Piece of Equipment

Figure 15:
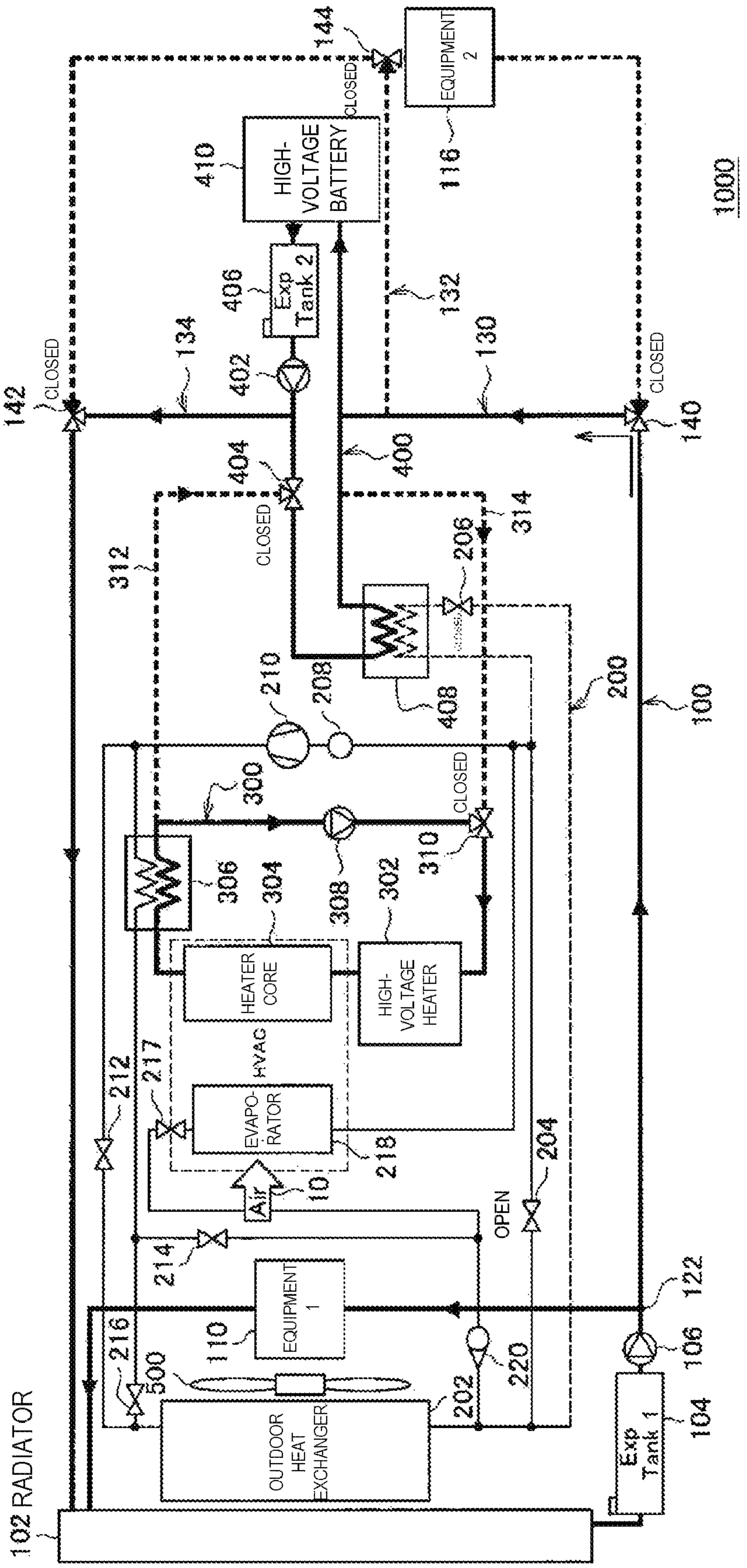
FIG. 15 is a schematic diagram illustrating a state of regulating the temperature of the high-voltage battery by utilizing powertrain cooling water in the configuration illustrated in FIG. 14.

FIG. 15 is a schematic diagram illustrating a state of regulating the temperature of the high-voltage battery 410 by utilizing powertrain cooling water in the configuration illustrated in FIG. 14. FIG. 15 illustrates the case of not using waste heat from the second piece of equipment 116. As illustrated in FIG. 15, by controlling the bypass three-way valve 140, the channel proceeding from the three-way valve 140 to the second piece of equipment 116 is closed. In addition, the three-way valve 144 is also closed.

For this reason, the powertrain coolant flows from the three-way valve 140 through the bypass channel 130 to the battery temperature regulation circuit 400. Additionally, the powertrain coolant flowing to the battery temperature regulation circuit 400 enters the battery temperature regulation circuit 400 and flows in the direction of the high-voltage battery 410→water pump 402→bypass channel 134→three-way valve 142. With this arrangement, it is possible to use the powertrain coolant to regulate the temperature of the high-voltage battery 410.

Also, in the example illustrated in FIG. 15, since heat is not exchanged with the battery temperature regulation circuit 400, the refrigerant circuit 200 may be used exclusively to regulate the temperature of the passenger compartment.

3.2. Case of Using Waste Heat from Second Piece of Equipment

Figure 16:
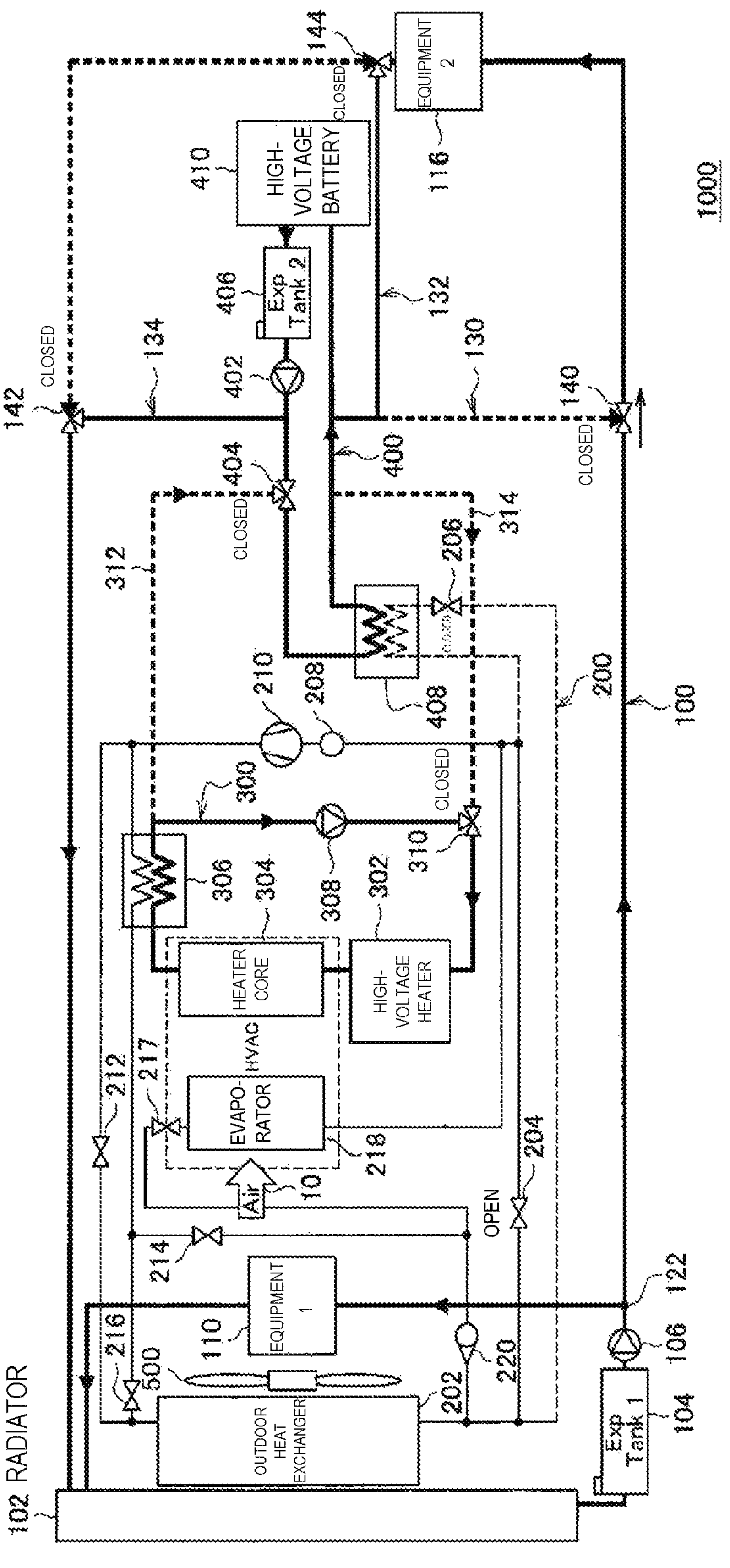
FIG. 16 is a schematic diagram illustrating a case of using the waste heat of a second piece of equipment.

FIG. 16 is a schematic diagram illustrating a case of using the waste heat of the second piece of equipment. In the example illustrated in FIG. 16, by controlling the bypass three-way valve 140, the channel proceeding from the three-way valve 140 to the second piece of equipment 116 is opened, and the channel proceeding from the three-way valve 140 to the battery temperature regulation circuit 400 is closed.

Also, by controlling the three-way valve 144, the channel proceeding from the three-way valve 144 to the battery temperature regulation circuit 400 is opened, and the channel proceeding from the three-way valve 144 to the three-way valve 142 is closed.

For this reason, the coolant after cooling the second piece of equipment 116 flows from the three-way valve 144 through the bypass channel 132 to the battery temperature regulation circuit 400. Additionally, the powertrain coolant flowing to the battery temperature regulation circuit 400 enters the battery temperature regulation circuit 400 and flows in the direction of the high-voltage battery 410→water pump 402→bypass channel 134→three-way valve 142. With this arrangement, the coolant after cooling the second piece of equipment 116 may be used to regulate the temperature of the high-voltage battery 410.

By having the coolant cool the second piece of equipment 116, heat is exchanged between the second piece of equipment 116 and the coolant. With this arrangement, the waste heat from the second piece of equipment 116 may be introduced into the battery temperature regulation circuit 400. Consequently, it becomes possible to utilize the waste heat from the second piece of equipment 116 to regulate the temperature of the high-voltage battery 410, and more particularly, it becomes possible to utilize the waste heat to warm up the high-voltage battery 410.

As above, in the embodiment, when regulating the temperature of the high-voltage battery 410, the three systems of the power electronics cooling circuit 100, the refrigerant circuit 200, and the heating circuit 300 may be used. It is possible to achieve the temperature regulation of the high-voltage battery 410 by selecting an optimal system that satisfies requirements such as power consumption, time to reach a target temperature, and the like.

Also, by using the powertrain coolant to regulate the temperature of the high-voltage battery 410, the motorized compressor 210 of the refrigerant circuit 200 and the high-voltage heater 302 of the heating circuit 300 may be used exclusively to regulate the temperature of the passenger compartment. Consequently, the ability to regulate the temperature of the passenger compartment may be improved, and user comfort and convenience may be improved.

In one embodiment, the bypass channel 130 illustrated in FIG. 14 is not provided, and a bypass channel 136 is provided instead of the bypass channel 130. Additionally, a solenoid valve 414 is provided between the site where the bypass channel 136 and the battery temperature regulation circuit 400 are coupled and the site where the bypass channel 130 and the battery temperature regulation circuit 400 are coupled.

According to the disclosure, it becomes possible to regulate a temperature of a battery with optimal energy efficiency.

The invention claimed is:

1. A vehicle heat management system for a vehicle comprising:

a refrigerant circuit configured to circulate a refrigerant to regulate a temperature inside a passenger compartment;

a heating circuit configured to circulate liquid that exchanges heat with the refrigerant, the heating circuit being capable of regulating the temperature inside the passenger compartment;

a battery temperature regulation circuit configured to regulate a temperature of a battery by introducing liquid of the heating circuit or liquid that exchanges heat with the refrigerant to the battery;

an equipment cooling circuit including a first circuit and a second circuit coupled with the first circuit via a radiator in parallel, the first circuit including a first piece of equipment and configured to circulate liquid to regulate temperature of the first piece of equipment, the first piece of equipment including at least one of a first driving motor for driving the vehicle and a circuit for driving the first driving motor, and the second circuit configured to include a second piece of equipment and configured to circulate liquid to regulate temperature of the second piece of equipment, the second piece of equipment other than the first piece of equipment and including at least one of a second driving motor for driving the vehicle and a circuit for driving the second driving motor, wherein the second circuit is configured to include:

a first channel configured to couple the battery temperature regulation circuit with the first circuit via the radiator by bypassing the second piece of equipment included in the second circuit, and introduce liquid cooled by the equipment cooling circuit into the battery temperature regulation circuit; and a second channel configured to couple, between the radiator and the second piece of equipment, the battery temperature regulation circuit with the second circuit, the battery temperature regulation circuit being on a downstream side of the second piece of equipment, and configured to introduce liquid warmed by the second piece of equipment to flow from the second piece of equipment through a control valve through the second channel prior to entering the battery temperature regulation circuit, wherein the temperature of the battery is regulated by selectively routing liquid flow through the first channel and liquid flow through the second channel.

2. The vehicle heat management system according to claim 1, wherein when the equipment cooling circuit and the battery temperature regulation circuit are coupled, liquid circulating through the equipment cooling circuit is introduced into the battery temperature regulation circuit.

3. The vehicle heat management system according to claim 2, further comprising:

a channel configured to introduce liquid flowing downstream from the equipment into the battery temperature regulation circuit.

4. The vehicle heat management system according to claim 2, further comprising:

a channel configured to introduce liquid that has exchanged heat with outdoor air at a radiator into the battery temperature regulation circuit, wherein the equipment cooling circuit comprises the radiator configured to cool the circulating liquid.

5. The vehicle heat management system according to claim 1, wherein the heating circuit is coupled to one or more valves, the one or more valves being configured to at least partially restrict the liquid from flowing into the battery temperature regulation circuit.

6. The vehicle heat management system according to claim 1, further comprising:

a pump coupled with the second piece of equipment, the pump being on an upstream side of the second piece of equipment, wherein the pump is configured to allow liquid warmed by the second piece of equipment to flow from the equipment into the battery temperature regulation circuit.

7. The vehicle heat management system according to claim 1, wherein the second circuit including a first valve, a second valve and a third valve, the first valve is a three-way valve, arranged on an upstream side of the second piece of equipment, and configured to couple among the radiator, the second piece of equipment and the battery temperature regulation circuit on an upstream side of the battery, the second valve is a three-way valve, arranged on a downstream side of the second piece of equipment, and configured to couple among the radiator, the second piece of equipment, and the battery temperature regulation circuit on an upstream side of the battery, and the third valve is a three-way valve, arranged between the radiator and second piece of equipment, and configured to couple among the second valve, the radiator, and the battery temperature regulation circuit on a downstream side of the battery.

8. The vehicle heat management system according to claim 7, wherein in the first channel, the second circuit is configured to include the first valve where a channel proceeding from the first valve to the second piece of equipment is closed, the second valve where a channel proceeding from the second valve to the battery temperature regulation circuit is closed, and the third valve where a channel proceeding from the third valve to the second piece of equipment is closed.

9. The vehicle heat management system according to claim 7, wherein in the second channel, the second circuit is configured to include the first valve where a channel proceeding from the first valve to the battery temperature regulation circuit is closed, the second valve where a channel proceeding from the second valve to the third valve is closed, and the third valve where a channel proceeding from the third valve to the second valve is closed.

10. A vehicle heat management system for a vehicle comprising:

a refrigerant circuit configured to circulate a refrigerant to regulate a temperature inside a passenger compartment;

a heating circuit configured to circulate liquid that exchanges heat with the refrigerant, the heating circuit being capable of regulating the temperature inside the passenger compartment;

a battery temperature regulation circuit configured to regulate a temperature of a battery by introducing liquid of the heating circuit or liquid that exchanges heat with the refrigerant to the battery;

an equipment cooling circuit including a first circuit and a second circuit coupled with the first circuit via a radiator in parallel, the first circuit including a first piece of equipment and configured to circulate liquid to regulate temperature of the first piece of equipment, the first piece of equipment including at least one of a first driving motor for driving the vehicle and a circuit for driving the first driving motor, and the second circuit configured to include a second piece of equipment and configured to circulate liquid to regulate temperature of the second piece of equipment, the second piece of equipment other than the first piece of equipment and including at least one of a second driving motor for driving the vehicle and a circuit for driving the second driving motor, wherein the second circuit is configured to include:

a first channel configured to couple the battery temperature regulation circuit with the first circuit via the radiator by bypassing the second piece of equipment included in the second circuit, and introduce liquid cooled by the equipment cooling circuit into the battery temperature regulation circuit; and a second channel configured to couple, between the radiator and the second piece of equipment, the battery temperature regulation circuit with the second circuit on a downstream side of the second piece of equipment, and configured to introduce liquid warmed by the second piece of equipment to flow from the second piece of equipment through a control valve through the second channel prior to entering the battery temperature regulation circuit, the temperature of the battery is regulated by selectively routing liquid flow through the first channel and liquid flow through the second channel, and wherein the heating circuit is coupled to one or more valves, the one or more valves being configured to at least partially restrict the liquid from flowing into the battery temperature regulation circuit.

* * * * *